United States Patent
Tanev et al.

(10) Patent No.: US 12,486,792 B2
(45) Date of Patent: Dec. 2, 2025

(54) METHANE OXIDATION CATALYST AND A METHOD OF MAKING AND USING THEREOF

(71) Applicant: SHELL OIL COMPANY, Houston, TX (US)

(72) Inventors: Peter Tanev Tanev, Houston, TX (US); Mario Soorholtz, Mannheim (DE)

(73) Assignee: SHELL USA, INC., Houston, TX (US)

(*) Notice: Subject to any disclaimer, the term of this patent is extended or adjusted under 35 U.S.C. 154(b) by 759 days.

(21) Appl. No.: 17/634,135

(22) PCT Filed: Aug. 20, 2020

(86) PCT No.: PCT/US2020/047129
§ 371 (c)(1),
(2) Date: Feb. 9, 2022

(87) PCT Pub. No.: WO2021/035019
PCT Pub. Date: Feb. 25, 2021

(65) Prior Publication Data
US 2022/0268191 A1  Aug. 25, 2022

Related U.S. Application Data

(60) Provisional application No. 62/889,078, filed on Aug. 20, 2019.

(51) Int. Cl.
*F01N 3/10* (2006.01)
*B01J 6/00* (2006.01)
(Continued)

(52) U.S. Cl.
CPC .............. *F01N 3/103* (2013.01); *B01J 6/001* (2013.01); *B01J 21/066* (2013.01); *B01J 27/13* (2013.01);
(Continued)

(58) Field of Classification Search
CPC ...... F01N 3/103; F01N 2570/12; B01J 6/001; B01J 21/066; B01J 27/13; B01J 37/0201;
(Continued)

(56) References Cited

U.S. PATENT DOCUMENTS 4,427,502 A  1/1984  Abys
4,809,154 A  2/1989  Newton
(Continued)

FOREIGN PATENT DOCUMENTS

CN  88100589 A  9/1988
CN  102759555 A  10/2012
(Continued)

OTHER PUBLICATIONS

Jia-Lin Bi, Yeh-Yeau Hong, Chia-Chan Lee, Chuin-Tih Yeh, Chen-Bin Wang, Novel zirconia-supported catalysts for low-temperature oxidative steam reforming of ethanol Sep. 19, 2007, Catalysis Today, 129, 322â329 (Year: 2007).*
(Continued)

*Primary Examiner* — Stuart L Hendrickson
*Assistant Examiner* — Joshua Maxwell Speer
(74) *Attorney, Agent, or Firm* — SHELL USA, INC.

(57) ABSTRACT

A sulfur-resistant, high activity methane oxidation catalyst for use in removing methane from gas streams having a concentration of methane by oxidizing the methane. The methane oxidation catalyst is especially useful in processing gas streams that also have a concentration of a sulfur compound. The sulfur-resistant methane oxidation catalyst includes a unique multi-crystalline zirconia as a support for a platinum component and a ruthenium component. The multi-crystalline zirconia contributes to the excellent properties of the catalyst. The platinum and ruthenium components can be included in the methane oxidation catalyst in a specific weight ratio that also contributes to the enhanced
(Continued)

properties of the catalyst. The sulfur-resistant methane oxidation catalyst may also include a chloride component that contributes to enhanced properties of the catalyst.

9 Claims, 5 Drawing Sheets

(51) Int. Cl.
| | |
|---|---|
| B01J 21/06 | (2006.01) |
| B01J 27/13 | (2006.01) |
| B01J 37/02 | (2006.01) |
| B01J 37/03 | (2006.01) |
| B01J 37/04 | (2006.01) |
| B01J 37/08 | (2006.01) |

(52) U.S. Cl.
CPC ......... B01J 37/0201 (2013.01); B01J 37/038 (2013.01); B01J 37/04 (2013.01); B01J 37/08 (2013.01); *F01N 2570/12* (2013.01)

(58) Field of Classification Search
CPC . B01J 37/038; B01J 37/04; B01J 37/08; B01J 27/10; B01J 23/462; B01D 2255/1021; B01D 2255/1026; B01D 2255/20715; B01D 2257/7025; B01D 2258/018; B01D 53/944
See application file for complete search history.

(56) References Cited

U.S. PATENT DOCUMENTS

| | | |
|---|---|---|
| 5,326,253 A | 7/1994 | Dalla Betta et al. |
| 5,405,260 A | 4/1995 | Della Betta et al. |
| 5,741,467 A | 4/1998 | Williamson et al. |
| 6,037,303 A | 3/2000 | Peratello et al. |
| 6,037,307 A | 3/2000 | Campbell et al. |
| 6,391,276 B1 | 5/2002 | Suda et al. |
| 7,364,712 B2 | 4/2008 | Ohtsuka et al. |
| 7,371,706 B2 | 5/2008 | Ohtsuka et al. |
| 7,524,474 B2 | 4/2009 | Hedouin |
| 8,568,675 B2 | 10/2013 | Deeba et al. |
| 9,481,594 B2 | 11/2016 | Gaubil et al. |
| 11,173,473 B2 | 11/2021 | Tanev et al. |
| 2006/0100099 A1 | 5/2006 | Weissman |
| 2006/0178261 A1 | 8/2006 | Larcher et al. |
| 2006/0280667 A1 | 12/2006 | Oonkj et al. |
| 2011/0214412 A1 | 9/2011 | Chiffey et al. |
| 2013/0164201 A1 | 6/2013 | Hernandez et al. |
| 2014/0001407 A1 | 1/2014 | Milanov et al. |
| 2015/0314274 A1 | 11/2015 | Shen et al. |
| 2016/0003529 A1 | 1/2016 | Minta et al. |
| 2016/0008790 A1 | 1/2016 | Takami et al. |
| 2019/0022625 A1 | 1/2019 | Tanev et al. |
| 2019/0046958 A1 | 2/2019 | Wei et al. |

FOREIGN PATENT DOCUMENTS

| | | |
|---|---|---|
| CN | 103249676 A | 8/2013 |
| CN | 103433026 A | 12/2013 |
| CN | 103962123 A | 8/2014 |
| CN | 104353455 A | 2/2015 |
| JP | S59156434 A | 9/1984 |
| JP | H06506290 A | 7/1994 |
| JP | 11319559 A | 11/1999 |
| JP | 2000176289 A | 6/2000 |
| JP | 2003245549 A | 9/2003 |
| JP | 2006181569 A | 7/2006 |
| JP | 2007090331 A | 4/2007 |
| JP | 4356324 B2 | 11/2009 |
| JP | 2011212508 A | 10/2011 |
| JP | 4901366 B2 | 3/2012 |
| JP | 5865110 B2 | 2/2016 |
| RU | 2530066 C1 | 10/2014 |
| WO | 9824726 A1 | 6/1998 |
| WO | 2005044957 A2 | 5/2005 |
| WO | 2009057961 A2 | 5/2009 |
| WO | 2009063092 A2 | 5/2009 |
| WO | 2009098278 A2 | 8/2009 |
| WO | 2014001423 A1 | 1/2014 |
| WO | 2016139283 A1 | 9/2016 |

OTHER PUBLICATIONS

Jia-Lin Bi, Yeh-Yeau Hong, Chia-Chan Lee, Chuin-Tih Yeh, Chen-Bin Wang, Novel zirconia-supported catalysts for low-temperature oxidative steam reforming of ethanol Sep. 19, 2007, Catalysis Today, 129, 322-329 (Year: 2007).*
Prashant V. Kamat, Absolute, Arbitrary, Relative, or Normalized Scale? How to Get the Scale Right, : ACS Energy Lett., 4, 2005-2006 (Year: 2019).*
M. R. Gauna, M. S. Conconi, S. Gomez, G. Suárez, E. F. Aglietti, N. M. Rendtorff, Monoclinic—Tetragonal Zirconia Quantification of Commercial Nanopowder Mixtures By XRD and DTA, Oct. 20, 2015, Ceramics—Silikáty 59 (4) 318-325 (Year: 2015).*
International Search Report and Written Opinion received for PCT Patent Application No. PCT/US2020/047129, mailed on Jan. 14, 2021, 11 pages.
Mirkelamoglu et al., "Dual-catalyst Aftertreatment of Lean-burn Engine Exhaust", Catalysis Today, vol. 151, Issue No. 3-4, Jun. 19, 2010, pp. 386-394.
Faticanti et al., "Pd Supported on Tetragonal Zirconia: Electrosynthesis, Characterization and Catalytic Activity toward CO Oxidation and CH4 Combustion", Applied Catalysis B: Environmental, vol. 60, Issue No. 1-2, Sep. 1, 2005, pp. 73-82, XP027813751.
Cordoba et al., "No Reduction by CH4 over Pd/Co-Sulfated Zirconia Catalysts", Applied Catalysis B: Environmental, vol. 56, Issue No. 4, Apr. 8, 2005, pp. 269-277, XP027813907.
Amairia et al., "Sol Gel Derived Pd/Al2O3-ZrO2 as Catalysts for Methane Combustion: Effect of Zirconium Loading", Journal of Sol-Gel Science and Technology, vol. 54, Issue No. 1, Jan. 21, 2010, pp. 29-35, XP019792512.
Meimei, "Development of Sol-Gel Prepared Palladium-Based Sulfated Zirconia Catalysts for Nitrogen Oxides Reduction with Methane", Thesis, Jan. 1, 2009, 108 pages, XP002743153.
Tidahy et al., "Nanostructured Macro- Mesoporous Zirconia Impregnated by Noble Metal for Catalytic total oxidation of toluene", Catalysis Today, Elsevier, vol. 137, Issue No. 2-4, Sep. 30, 2008, pp. 335-339, XP023438000.
Guorong et al., "Preparation of Nano-TiO2 by Sol-Gel Method and Its Phase Transformation", Proceedings of the 9th National Conference on Applied Chemistry of the Chinese Chemical Society, Sep. 30, 2005, p. 56.
Holmgreen et al., "Dual-catalyst Aftertreatment of Lean-burn Natural Gas Engine Exhaust", Applied Catalysis B: Environmental, vol. 74, Issue No. 1-2, Jun. 18, 2007, pp. 73-82.
Wang et al., "Surfactant-assisted Synthesis of Defective Zirconia Mesophases And Pd/zro2: Crystalline Structure and Catalytic Properties", Applied Surface Science, vol. 254, Issue No. 16, Jun. 15, 2008, pp. 5061-5072, KP022650399.
Ohtsuka, "The Oxidation of Methane at Low Temperatures over Zirconia-Supported Pd, Ir and Pt Catalysts and Deactivation by Sulfur Poisoning", Catalysis Letter, vol. 141, Issue No. 3, Mar. 2011, pp. 413-419, XP019884430.
Bautista et al., "Influence of Sulphate Doping on Pd/Zirconia Based Catalysts for the Selective Catalytic Reduction of Nitrogen Oxides with Methane", Applied Catalysis B: Environmental, vol. 71, Issue No. 3-4, 2007, pp. 254-261.
Kovtunov et al., "Heterogeneous Addition of H2 to Double and Triple Bonds over Supported Pd Catalysts: a Parahydrogen-Induced Polarization Technique Study", Physical Chemistry Chemical Physics, vol. 14, Issue No. 31, Jan. 1, 2012, p. 11008, XP055226901.
International Search Report and Written Opinion received for PCT Patent Application No. PCT/EP2016/054490, mailed on Aug. 11, 2016, 19 pages.

(56) References Cited

OTHER PUBLICATIONS

Pettersen et al., "Technical and Operational Innovation for Onshore and Floating LNG", 17th International Conference and Exhibition on Liquefied Natural Gas, Apr. 16-19, 2013, 12 pages, XP055134869.
International Search Report and Written Opinion received for PCT Patent Application No. PCT/EP2017/068577, mailed on Oct. 13, 2017, 12 pages.
International Search Report and Written Opinion received for PCT Patent Application No. PCT/EP2017/070711, mailed on Nov. 6, 2017, 15 pages.
Yang et al., "Influence of Crystal Form of Zro2 Support on Catalytic Combustion Performance of Pdo/zro2 System", Proceedings of the 9th National Youth Catalytic Conference, pp. 41-42.
International Search Report and Written Opinion received for PCT Patent Application No. PCT/EP2017/070732, mailed on Nov. 6, 2017, 25 pages.
Filiz et al., "Highly Selective Hydrogenation of Levulinic Acid to y-Valerolactone over Ru/Zr02 Catalysts", Catalysis Letters, vol. 147, Issue No. 7, May 24, 2017, pp. 1744-1753, XP036253234.
Kundakovic et al., "Deep Oxidation of Methane over Zirconia Supported Ag Catalysts", Applied Catalysis A: General, vol. 183, Issue No. 1, Jul. 5, 1999, pp. 35-51, XP004271828.
Wang et al., "Structural Evolution and Catalytic Properties of Nanostructured Cu/Zr02 Catalysts Prepared by Oxalate Gel-Coprecipitation Technique", Journal of Physical Chemistry C, vol. 111, Issue No. 44, Nov. 1, 2007, pp. 16549-16557, XP055328349.
Office Action Received for Korean Application No. 10-2017-7023815, Mailed on Dec. 12, 2022, 29 Pages(15 Pages of English Translation and 14 Pages of Official Copy).
Office Action Received for Chinese Application No. 202080058733.4, Mailed on Jun. 1, 2023, 23 Pages (14 Pages of English Translation and 9 Pages of Official Copy).
Bi et al., "Novel zirconia-supported catalysts for low-temperature oxidative steam reforming of ethanol", Catalysis Today, vol. 129, 2007, pp. 322-329.
Ohtsuka, "Effects of Ru or Rh Addition on the Activity and Sulfur Tolerance of Pt/Zr02 for the Oxidation of Methane at Low Temperatures", Catalysis Letters, vol. 143, Jul. 4, 2013, pp. 1043-1050.
Extended European Search Report Received for European Application No. 20855361.0, Mailed on Aug. 24, 2023, 7 Pages.

* cited by examiner

METHANE OXIDATION CATALYST AND A METHOD OF MAKING AND USING THEREOF

CROSS REFERENCE TO RELATED APPLICATIONS

This is a National stage application of International application No PCT/US2020/047129, filed Aug. 20, 2020, which claims priority of U.S. Provisional application No. 62/889,078, filed 20 Aug. 2019 which is incorporated herein by reference in its entirety.

The invention relates to a catalyst composition that is useful for removing methane from exhaust gases, a method of making the catalyst composition, and process of use.

BACKGROUND

Natural gas is an abundant and economical alternative fuel to oil-derived fuels such as gasoline, kerosene and diesel. Manufacturers of engines used in transport and stationary applications are therefore shifting their attention from engines that use traditional oil-derived fuels to engines that use cheaper, cleaner burning, and more environmentally friendly compressed natural gas (CNG) or liquefied natural gas (LNG) fuels. Because methane is the major component of natural gas, the exhaust gas from natural gas fueled engines typically contains residual concentrations of methane. The release into the atmosphere of this residual methane with the engine exhaust is not desired and is limited by environmental emission regulations. Consequently, it is desirable and important to remove the methane from engine exhaust gas before its release into the atmosphere. One way of doing this is by catalytically oxidizing the methane to carbon dioxide and water before the discharge of the engine exhaust gas.

Japanese Patent 4901366 discloses a catalyst used for oxidizing and removing methane from exhaust gas. This catalyst includes platinum and ruthenium catalytic components loaded onto a zirconium oxide carrier having a specific area of about 2 to 60 m$^2$/g. The zirconium oxide is in the form of monoclinic crystal phase and includes no more than 10 mass % that is in the tetragonal and cubic crystal forms. A binder such as alumina or silica can be used with the carrier in trace amounts not to exceed 2% by mass. The mass ratio of platinum-to-ruthenium loaded onto the zirconium oxide is from about 2 to 100% with the loaded platinum from about 0.1 to 5% of the zirconium oxide and loaded ruthenium from 0.5 to 20% of the zirconium oxide. The catalyst is prepared by impregnating the zirconium oxide with a platinum and ruthenium solution made with water-soluble platinum and ruthenium compounds. The impregnated zirconium oxide is dried and then fired at a temperature of from 450 to 650° C.

U.S. Pat. No. 7,371,706 (a division of U.S. Pat. No. 6,602,481) also discloses a catalyst for use in removing methane from exhaust gas. This catalyst comprises palladium or a combination of palladium and platinum supported on a carrier that is selected from zirconia, sulfated zirconia, and tungsten-zirconia. The palladium is present in the catalyst in an amount of from about 1% to about 25%, and, if platinum is present, the ratio of platinum-to-palladium is about 5% to about 50%. The catalyst is prepared by impregnating the zirconia carrier followed by drying and then calcination at a temperature in the range of about 450° C. to about 700° C.

Another methane oxidation catalyst is disclosed in U.S. Pat. No. 10,112,178. This catalyst comprises a noble metal supported on a non-modified zirconia. The non-modified zirconia comprises a specific weight ratio of tetragonal crystalline phase zirconium dioxide to monoclinic crystalline phrase zirconium dioxide that is in the range of from 1:1 to 31:1. The zirconia is not a physical mixture of separate zirconia components with each having a different crystalline phase form or structure. Instead, the zirconia is made by the thermal conversion of a single precursor to give zirconia comprising at least two crystalline phases of zirconium dioxide. The preferred noble metals of the catalyst are palladium, platinum, and rhodium. Ruthenium is not a preferred noble metal. In the further preparation of the catalyst the noble metal-impregnated zirconia is dried and then calcined at a temperature in the range of from 450 to 600° C.

It is important for methane oxidation catalysts used to treat engine exhaust to express high methane oxidation activity. It is also important for these catalysts to be resistant to poisoning or deactivation by the presence of catalyst poisons contained in engine exhaust. Engine exhaust typically contains sulfur compounds, such as sulfur dioxide, that are poisons to most prior art methane oxidation catalysts. It is desirable to develop a methane oxidation catalyst that has both high activity for oxidation of small concentrations of methane or other hydrocarbons contained in engine exhaust while being resistant to poisoning by sulfur compounds or other poisons.

SUMMARY OF THE INVENTION

Accordingly, provided is a methane oxidation catalyst that comprises multi-crystalline zirconia, a platinum component, and a ruthenium component.

Further provided is a method of making a methane oxidation catalyst. In one method, a methane oxidation catalyst is prepared by mixing multi-crystalline zirconia powder, a platinum precursor compound, and a ruthenium precursor compound to form a slurry mixture. The slurry mixture is dried to provide a powder that is calcined under effective calcination conditions to provide the methane oxidation catalyst.

Another method of making a methane oxidation catalyst is provided that includes preparing or providing a support particle that comprises multi-crystalline zirconia. The support particle is impregnated with a platinum precursor compound and a ruthenium precursor compound to provide an impregnated support particle. The impregnated support particle is calcined under effective calcination conditions to provide the methane oxidation catalyst.

Still, another method provides for making a supported methane oxidation catalyst system. In this method a slurry mixture is formed by mixing multi-crystalline zirconia powder, a platinum precursor compound, and a ruthenium precursor compound. A substrate is coated with the slurry mixture to provide a washcoated substrate. The washcoated substrate is then dried to provide a dried washcoated substrate that is calcined under effective calcination conditions to provide the supported methane oxidation catalyst system.

The methane oxidation catalyst of the invention is useful in oxidizing methane in a gas stream that contains methane by contacting the gas stream with the methane oxidation catalyst under conditions for oxidizing the methane.

DETAILED DESCRIPTION OF THE INVENTION

The present invention relates to a high activity methane oxidation catalyst useful for the oxidation of methane and other hydrocarbons contained in gas streams treated by the application of the catalyst. The catalyst is particularly useful for treating gas streams containing small concentrations of methane. Another property of the catalyst is, unlike prior art catalyst compositions, its exceptional resistance to poisoning by sulfur. The catalyst maintains its high methane oxidation activity even in the presence of or when it is exposed to sulfur poisons that are often contained in the gas stream treated by use of the catalyst.

Also presented are inventive methods of making the high-activity, sulfur-resistant methane oxidation catalysts, structures including the catalyst, and other forms of the catalyst. These methods provide for the preparation of the inventive high activity and sulfur resistant methane oxidation catalyst. It is believed that the preparation methods of the invention impart in some way certain features to the catalyst compositions and structures that contribute to their properties of high methane oxidation activity and resistance to sulfur poisoning.

One feature of the inventive catalyst that contributes to its high activity and sulfur resistance is the specific combination of the noble metals of platinum and ruthenium that are contained in the catalyst composition. It also has been discovered that the relative concentrations of platinum and ruthenium in the inventive catalyst can be important to providing a catalyst having high methane oxidation catalytic activity.

Another significant and essential feature of the inventive catalyst is the incorporation of platinum and ruthenium onto a multi-crystalline zirconia support. The characteristics of the multi-crystalline zirconia support are important to providing for the catalytic and sulfur resistance properties of the catalyst of the invention.

The chloride content of the inventive catalyst is another significant feature that contributes to its enhanced activity and sulfur resistance. To enhance the activity and sulfur resistance of the inventive catalyst, the concentration range of the chlorine component of the catalyst should be within a certain range. The source of the chlorine can be from the noble metal salts that are used in the inventive methods for making the catalyst.

The methane oxidation catalyst of the invention comprises multi-crystalline zirconia, a platinum component, and a ruthenium component. Multi-crystalline zirconia is an essential component of the methane oxidation catalyst of the invention that contributes to its enhanced properties. A preferred embodiment of the inventive methane oxidation catalyst includes a chloride component as well as the multi-crystalline zirconia, platinum, and ruthenium components. It has been discovered that the chloride component of the methane oxidation catalyst acts as a promoter that enhances the methane oxidation activity of the inventive catalyst when the concentration of the chloride component in the catalyst is within a specific range.

The physical attributes of the multi-crystalline zirconia component of the inventive catalyst are important to providing for the improved properties of the catalyst. The multi-crystalline zirconia component of the inventive composition is polycrystalline zirconia that includes both zirconia in the tetragonal crystalline form (t-$ZrO_2$) and zirconia in the monoclinic crystalline form (m-$ZrO_2$). The multi-crystalline zirconia is a transitional zirconia that includes both t-$ZrO_2$ and m-$ZrO_2$. Thus, the multi-crystalline zirconia is not a simple physical mixture of pure-phase t-$ZrO_2$ and pure-phase m-$ZrO_2$. Rather, the multi-crystalline zirconia is obtained, for example, by converting zirconia precursor material by calcining it at a high temperature within a temperature range that results in converting the precursor into transitional, polycrystalline zirconia that comprises both tetragonal zirconia and monoclinic zirconia.

The multi-crystalline zirconia of the inventive catalyst includes substantially more than 10 wt. % tetragonal zirconia, based on the weight of the multi-crystalline zirconia. The tetragonal phase of the multi-crystalline zirconia normally exceeds 50 wt. %. It is preferred, though, that the tetragonal phase exceed 70 wt. %, and, more preferred, the tetragonal phase should exceed 90 wt. %. Typically, the multi-crystalline zirconia contains from 0.1 to 5 wt. % monoclinic phase zirconia; therefore, resulting in a practical upper limit for the tetragonal phase of 99.9 wt. %. Thus, the weight ratio of the tetragonal zirconia-to-monoclinic zirconia (t-$ZrO_2$/m-$ZrO_2$) in the multi-crystalline zirconia normally exceeds 1:1 (i.e., the tetragonal phase exceeds 50 wt. % of the total multi-crystalline zirconia). An upper limit for the t-$ZrO_2$/m-$ZrO_2$ weight ratio is about 32:1 (i.e., the tetragonal phase no more than 97 wt. % of the total multi-crystalline zirconia), or 25:1 (i.e., the tetragonal phase is no more than 96 wt. % of the total multi-crystalline zirconia), or even 20:1 (i.e., the tetragonal phase is no more than 95 wt. % of the total multi-crystalline zirconia).

The weight ratio of the tetragonal zirconia to monoclinic zirconia is the weight ratio as determined by standard quantitative X-Ray Diffraction (XRD) spectroscopic analysis using commercially available equipment and software. An XRD signal intensity ratio of the signal intensity at 2θ=30.10 (characteristic for tetragonal zirconia) to the signal intensity at 2θ=28.10 (characteristic for monoclinic zirconia) provides for the determination of the relative amounts of the tetragonal and monoclinic crystallographic phases. The determination of the weight ratio of the tetragonal zirconia to monoclinic zirconia excludes other components that may be present in the multi-crystalline zirconia.

Thermal conversion of a single zirconia precursor may yield the multi-crystalline zirconia of the present invention having a distribution of tetragonal zirconia and monoclinic zirconia that allows for a high noble metal dispersion in the final catalyst composition. The multi-crystalline zirconia also provides for an advantageously high surface area. The distribution of tetragonal zirconia and monoclinic zirconia in the multi-crystalline zirconia is believed to restrict the diffusion, migration and/or agglomeration of the noble metal during preparation of the inventive catalyst and during its use. This benefits the methane oxidation activity and improves the stability of the catalyst, particularly under the hydrothermal conditions in treating exhaust gas from natural gas fueled engines.

The zirconia precursor may be any zirconium-comprising compound that converts into the multi-crystalline zirconia upon exposure to elevated temperatures. One or more thermal treatment steps of a zirconia precursor are used to convert the precursor to the multi-crystalline zirconia comprising both monoclinic zirconia and tetragonal zirconia. Preferably, a single zirconia precursor is converted.

To prepare the multi-crystalline zirconia, the zirconia precursor is calcined at a temperature in the range of from 670° C. to 1200° C. The preferred calcination temperature, however, is in the range of from 800° C. to 1000° C., and, most preferred, from 800° C. to 900° C. The step of calcining the zirconia precursor is preferably performed in an oxygen-comprising atmosphere, preferably air.

The multi-crystalline zirconia of the catalyst composition has a specific surface area in the range of from 10 to 200 $m^2/g$. More typically, the surface area is in the range of from 20 to 70 $m^2/g$, and, most typically, from 30 to 50 $m^2/g$.

The zirconia precursors used to prepare of the multi-crystalline zirconia may include a crystalline form of zirconia, amorphous zirconia and a zirconium-comprising precursor, such as a zirconium hydroxide and a zirconium hydroxide sol, a zirconium hydroxide gel, $ZrOCl_2$, $ZrCl_4$, $ZrO(NO_3)_2$, $Zr(NO_3)_4$, zirconium lactate, zirconium alkoxides, zirconium acetate, $Zr(CH_2CHCO_2)_4$, zirconium(IV) carbonate, $Zr(HPO_4)_2$, and $Zr(SO_4)_2$. The zirconia precursor may further include a zirconia stabilizing oxide, such as $Y_2O$, CaO, and MgO that allows for the tetragonal form of zirconia to exist at low or room temperatures.

The zirconia precursor may further contain impurities and other elements that are naturally present in the precursor compounds or are unintentionally or intentionally introduced during the manufacturing process. Possible impurities and elements include hafnium and silicon compounds, for example, hafnia and silica.

The essential metal components of the inventive catalyst include platinum and ruthenium. It has been discovered that the inventive catalyst composition, having a combination of both a platinum component and ruthenium component, provide for a materially higher methane conversion activity, i.e., an exceptionally lower T(50) for methane conversion, than similar catalyst compositions having either a single platinum component or a single ruthenium component. The inventive catalyst thus comprises both a platinum component and a ruthenium component.

The term "T(50)" used throughout this specification refers to the temperature at which at least 50 volume percent (vol %) of the methane contained in a combustion gas stream (typically at a concentration in the range of from 100 ppmv to 10,000 ppmv) is oxidized by the application of the catalyst. The T(50) value is a measure for the methane oxidation activity of a catalyst. A lower T(50) value indicates a higher methane oxidation activity of the catalyst. When measured under the same test conditions, the T(50) values provided by each catalyst can be used to compare their methane oxidation activities.

It is desirable for the concentrations of the noble metals in the inventive catalyst to be within a certain range to provide for its enhanced methane oxidation activity. The platinum component should be present in the inventive catalyst in an amount in the range of from 0.01 wt. % to 5 wt. %, and the ruthenium component should be present in an amount in the range of from 0.1 wt. % to 20 wt. %. These weight percent (wt. %) values are based on the noble metal component as metal, regardless of the actual form of the noble metal component, and the total weight of the methane oxidation catalyst.

It is preferred for the platinum component of the inventive catalyst to be present in an amount greater than 0.01 wt. % and less than 3 wt. %, and, more preferred, from 0.01 to less than 2 wt. %. The preferred concentration of the ruthenium component of the inventive catalyst in the inventive catalyst is in the range of from 0.2 wt. % to 20 wt. %, and, more preferred, from 0.5 wt. % to 15 wt. %.

In addition to the importance of the catalyst composition containing both platinum and ruthenium to provide a catalyst having high methane oxidation activity, it is further desirable for the weight concentration of platinum in the catalyst to be less than 1.5 times the weight concentration of ruthenium in the catalyst.

Having the right weight ratio of platinum-to-ruthenium in the inventive catalyst composition is important for it to have enhanced methane oxidation activity. If the platinum-ruthenium ratio is too high, then the catalyst begins to exhibit a significant decline in its methane oxidation activity relative to that of the catalyst having a lower platinum-ruthenium ratio. On the other hand, this activity increases as the platinum-ruthenium ratio decreases. But, once the platinum-ruthenium ratio is lowered to a certain level, the incremental improvement in the methane oxidation activity of the catalyst per incremental decrease in the platinum-ruthenium ratio becomes minimal.

It is, thus, desirable if not critical for the platinum-to-ruthenium weight ratio in the inventive catalyst to be within a specific range to provide for the optimum enhanced methane oxidation activity. The preferred range for the platinum-to-ruthenium weight ratio in the inventive catalyst is from 1.5 to 0.2. The more preferred range for the platinum-to-ruthenium weight ratio is from 1.2 to 0.25, and, most preferred, the ratio is in the range of from 1 to 0.3.

In another embodiment of the invention, the catalyst composition further comprises a chlorine component. The inclusion of chlorine or chloride as a component of the inventive methane oxidation catalyst in addition to the platinum and ruthenium metals and the multi-crystalline zirconia unexpectedly provides a catalyst having significantly better methane oxidation activity than comparative catalysts that contain no chlorine component. The chlorine is introduced into the catalyst composition by the application of the chlorine-containing noble metal salts that are used in the preparation of the catalyst. It is thought that during the preparation of the catalyst the chlorine of the noble metal precursor reacts with the noble metals to convert a portion of the metal to their oxychloride form that disperses on the surface of the zirconia support of the catalyst. This affect is believed to contribute to the unexpectedly high activity of the inventive catalyst.

To provide for the enhanced methane oxidation, the chloride component should be present in the catalyst at a concentration within the range of from 0.01 wt. % to 5 wt. %, based on the total weight of the catalyst and atomic chloride. The preferred chloride content of the inventive catalyst is for the chloride concentration to be within the range of from 0.05 wt. % to 3 wt. %, and, more preferred, it is within the range of from 0.1 wt. % to 2 wt. %. Most preferably, the chloride component is present in the catalyst in the amount in the range of from 0.15 wt. % to 1.5 wt. %. Standard known X-ray fluorescence (XRF) analysis is used to determine the weight percent of the chloride content of the catalyst.

The method of the invention is believed to provide a methane oxidation catalyst having high methane oxidation activity and resistance to sulfur poisoning. It is not only the individual components of the catalyst and their properties that contribute to the exceptional activity and sulfur resistance of the catalyst, but the way the components are combined and processed by the preparation methods of the invention that impart enhanced catalytic properties to composition as well.

In one method for making the methane oxidation catalyst, a slurry mixture is prepared by mixing in water the multi-crystalline zirconia that is in powder form with a platinum precursor compound and a ruthenium precursor compound. The components of the slurry mixture are combined in proportions that give a final catalyst composition as defined above.

The multi-crystalline zirconia powder of the slurry mixture comprises finely divided particles of multi-crystalline zirconia. The particles of the multi-crystalline powder should have a size distribution that allows for the formation of a slurry mixture when it is mixed with one or more noble metal aqueous mixtures or noble metal salt solutions containing the noble metal precursors of the catalyst composition. Typically, the particles of the multi-crystalline zirconia powder have a distribution of sizes with a median size of between 0.1 m to 500 μm.

It is preferred to prepare the slurry mixture by mixing an aqueous solution of a platinum salt compound and an aqueous solution of a ruthenium salt compound or by mixing a single aqueous solution including both a platinum salt compound and a ruthenium salt compound with the multi-crystalline zirconia powder.

The aqueous solution or solutions used in the method are prepared by any method known to those skilled in the art. Generally, the aqueous solution is made by dissolving an appropriate amount of the noble metal salt in water.

Any suitable platinum and ruthenium salt that provides for the active metal component of the inventive methane oxidation catalyst may be used in the preparation of the impregnation solution or solutions of the method.

Possible platinum metal precursors include $Pt(NH_3)_2Cl_4$, $H_2Pt(OH)_6$, $PtBr_2$, $PtCl_2$, $PtCl_4$, $(NH_4)_2PtCl_6$, $Pt(NH_3)_2Cl_2$, $Pt(CN)_2$, $Pt(NO_3)_2$, $Pt(NO_3)_4$, $PtO_2$, Platinum(II) acetylacetonate, Platinum(II) acetate, $Na_2PtCl_6$, $K_2PtCl_6$, $H_2PtCl_6$, $K_2PtCl_4$, Platinum(II) citrate, and platinum(II) oxalate. It is preferred for the platinum metal precursor to be a chlorine-containing platinum precursor compound that is selected from the group of platinum compounds consisting of chlorine-containing compounds of platinum including platinum (II) chloride $[PtCl_2]$, platinum (IV) chloride $[PtCl_4]$, salts of hexachloroplatinate that include chloroplatinic acid $[H_2PtCl_6]$, ammonium hexachloroplatinate $[(NH_4)_2PtCl_6]$, potassium hexachloroplatinate $[K_2PtCl_6]$, sodium hexachloroplatinate $[Na_2PtCl_6]$. The more preferred chlorine-containing platinum precursor is chloroplatinic acid.

Possible ruthenium metal precursors include $[Ru(NH_3)_6]Cl_2$, $[Ru(NH_3)_6]Cl_3$, $[Ru(NH_3)_5Cl]Cl_2$, $RuCl_3$, $RuCl_3 \cdot xH_2O$, $I_3Ru$, $I_3Ru \cdot H_2O$, $Ru(NO)(NO_3)_x(OH)_y$, $x+y=3$. It is preferred for the ruthenium metal precursor to be a chlorine-containing ruthenium precursor compound that is selected from the group of ruthenium compounds consisting of chlorine-containing compounds of ruthenium including ruthenium (III) chloride $[RuCl_3]$ and ruthenium oxychloride $[ROCl_2]$. The more preferred chlorine-containing ruthenium precursor is ruthenium chloride.

As is discussed elsewhere in this specification, an important embodiment of the inventive catalyst composition is for it to have a chloride component. The chlorine concentration of the inventive catalyst required to provide the enhanced activity over the activity of catalyst not having a material chlorine concentration is described above.

To provide the desired chlorine concentration in the methane oxidation catalyst, at least one of the noble metal precursors must be chlorine-containing noble metal precursor. Either the platinum precursor compound is a chlorine-containing platinum salt or the ruthenium precursor compound is a chlorine-containing ruthenium salt or both the platinum and ruthenium noble metal precursors are chlorine-containing salts. It is preferred for both noble metal precursors used in the preparation of the inventive methane oxidation catalyst to be a chlorine salt compound.

The slurry mixture is then dried by any suitable means or method known to those skilled in the art for drying a slurry mixture to yield a powder. The slurry mixture comprises the components of multi-crystalline zirconia powder, a platinum precursor compound, and a ruthenium precursor compound dissolved or mixed in water. If the drying step is done by spray drying, any suitable spray dryer may provide means for spray drying a slurry to yield a powder. Any other suitable drying method or means may be used for drying the slurry, including drying ovens and other types of drying equipment to yield the powder comprising multi-crystalline zirconia, a platinum compound, and a ruthenium compound. The drying may be done in air at a temperature typically in the range of from 35° C. to 120° C.

Calcining the dried powder is an important step in the preparation of the methane oxidation catalyst. The calcination temperature should be controlled within a certain temperature range to assure that the zirconia of the dried powder has the proper crystalline phase or phases required for the catalyst. The dried powder is therefore calcined in air at a calcination temperature in the range of from 450° C. to 1050° C. for at least 0.1 hours up to or about 20 hours. It is preferred to calcine the dried powder at a calcination temperature in the range of from 500° C. to 900° C., and, more preferred, the calcination temperature is in the range of from 525° C. to 800° C.

The calcined powder may itself be used as a methane oxidation catalyst or it may be formulated with a binder or other components and formed into aggregate particles or it may be used in a wash coat on monolith-type structures. The calcined powder should have the composition as described above.

The calcined powder may be formed into any suitable shape, including, for example, agglomerate particles, cylindrical and polylobe extrudates, balls, pellets, rings, and pills. One example of a catalyst composition is one that is made with the calcined powder by preparing a plastic mixture comprising an inorganic oxide material, such as alumina, silica, and silica-alumina, the calcined powder, and appropriate amounts of water, peptizing agents, extrusion aids, etc., to provide an extrudable paste. The extrudable paste is extruded to make extrudates that are dried and calcined under the same calcination conditions as defined above.

The calcined extrudates can comprise the methane oxidation catalyst, which includes the multi-crystalline zirconia, platinum, and ruthenium, and an inorganic oxide selected from the group consisting of alumina, silica, and silica-alumina. An exemplary calcined extrudate composition comprises from 10 to 98 wt. % multi-crystalline zirconia, from 1 to 30 wt. % inorganic oxide, from 0.01 to 5 wt. % platinum, from 0.1 to 20 wt. % ruthenium. The calcined extrudate composition may further comprise chlorine in the range of from 0.01 to 5 wt. %. The relative proportions of the platinum and ruthenium components of the catalyst are preferably within the ranges defined elsewhere in this specification.

To provide a substrate supported methane oxidation catalyst system, the slurry mixture is deposited onto a substrate in the form of a coating, washcoat or film. The terms washcoat, coating or film refer herein to the slurry mixture as a dispersion or a suspension that is applied to or placed upon the surface area of a substrate as a layer that is bonded to the substrate surface.

Suitable substrates used to prepare the substrate supported methane oxidation catalyst system include ceramic and metallic monoliths. Such ceramic and metallic monoliths are uniform substrates with well-defined pore or channel structures. The ceramic and metallic monoliths may be characterized by the number of pore channels per square inch, also referred to in the art as cells per square inch or CPSJ. Preferably, the ceramic or metallic monolith substrate includes pore channels in the range of from 50 to 10,000 pore channels per square inch (323 to 64,500 pore channels per $cm^2$), and, more preferably, from 150 to 1,000 pore channels per square inch (968 to 6,450 pore channels per $cm^2$).

In one preferred embodiment, the slurry mixture is placed on a ceramic or metallic monolith substrate comprising pore channels, defining an inner pore channel surface, to form a coating, washcoat or a film on the inner pore channel surface of the substrate of a thickness in the range of from 10 to 250 μm.

It is preferred for from 50 to 400 kg of the dried slurry mixture per cubic meter of monolith substrate to be supported on the monolith substrate. More preferably, the monolith substrate of the supported methane oxidation catalyst system supports from 75 to 300 kg of dried slurry mixture per cubic meter of monolith substrate.

After coating the substrate with the slurry mixture, the resulting washcoated substrate is dried under standard drying conditions to provide a dried washcoated substrate. The washcoated substrate is dried by any suitable method or means; but, typically, the drying is done in air at a temperature in the range of from 35° C. to 120° C. The dried washcoated substrate is then calcined under calcination conditions as described herein to provide the supported methane oxidation catalyst system.

Another form of the methane oxidation catalyst includes a formed support particle that is impregnated with the noble metals of the catalyst. The formed support particle comprises the multi-crystalline zirconia of the invention. The platinum and ruthenium impregnated formed support particle of the methane oxidation catalyst preferably further comprises a chlorine component.

This embodiment of the methane oxidation catalyst, which comprises an impregnated support particle, is made by first providing or preparing a support particle that comprises the multi-crystalline zirconia described herein. The formed shape of the support particle is any suitable shape that typically provides for the support of catalytic metal components and can include, for example, agglomerate particles, cylindrical and polylobed extrudates, balls, pellets, rings and pills.

Because of the contribution made by the multi-crystalline zirconia support to the unique characteristics of high methane oxidation activity and sulfur poisoning resistance of the inventive catalyst composition, it is important for the shaped support particle to comprise a predominant portion of the multi-crystalline zirconia. A binder may be used and mixed with the multi-crystalline zirconia before forming the mixture of binder and multi-crystalline zirconia into an agglomerate. Typical binders include inorganic oxides, such as alumina, silica, and silica-alumina.

To prepare the support particle that is impregnated with the platinum and ruthenium metals, a mixture of inorganic oxide binder material, multi-crystalline zirconia, and water is agglomerated, shaped and formed into a formed particle. The formed particle is made by any method known to those skilled in the art, but, a preferred method is by any suitable extrusion method for making cylindrical or lobed shaped particles.

The formed particle is dried and calcined under the same drying and calcination conditions as described elsewhere herein to provide the support particle of the methane oxidation catalyst. The support particle that is impregnated with the noble metals of the methane oxidation catalyst comprises multi-crystalline zirconia, and, further may comprise an inorganic oxide component. Other supports may include both inorganic oxide and multi-crystalline zirconia. An example of a support particle to be impregnated with noble metals comprises from 1 wt. % to 30 wt. % inorganic oxide and 70 wt. % to 99 wt. % multi-crystalline zirconia, with the weight percent based on the total dry weight of the support particle.

The support particle is then impregnated with an aqueous solution of a platinum salt compound and an aqueous solution of a ruthenium salt compound or with a single aqueous solution including both a platinum salt compound and a ruthenium salt compound. The aqueous solution or solutions used to impregnate the support particle are prepared by any method known to those skilled in the art. Generally, the aqueous solution is made by dissolving an appropriate amount of the noble metal salt in water. It is preferred to impregnate the support particle with the aqueous metal solution or solutions by applying any well-known incipient wetness impregnation method to provide an impregnated support particle.

Suitable platinum metal precursors and ruthenium metal precursors for impregnation of the support particle are described above. As further described, to provide a preferred methane oxidation catalyst having the desired chloride content it is important for at least one of the metal precursors of the impregnation solution to be chlorine-containing noble metal salt.

The impregnated support particle is then dried and calcined to provide the metals-impregnated supported methane oxidation catalyst of the invention. The metals-impregnated supported methane oxidation catalyst should have the noble metals loadings for the platinum and ruthenium components and in the relative proportions described above. Also, for the chloride content of the metals-impregnated supported methane oxidation catalyst is preferably as defined above.

The catalyst composition of the invention in any of its forms and as included on any catalytic structure or support has application in processes for oxidizing methane that is contained in a fluid stream to be treated for the removal of the methane. The catalyst is highly active for methane oxidation, and it is resistant to sulfur poisoning. It significantly maintains activity even with exposure to sulfur compounds. This makes the catalyst particularly useful for the removal of methane from gas streams that contain concentrations of sulfur compounds.

This process comprises contacting a gas stream, comprising methane, with a methane oxidation catalyst of the invention under methane oxidizing reaction conditions to yield a gas effluent having a reduced methane concentration that is below that of the gas stream. The gas stream has a sufficient oxygen concentration to oxidize at least part of the methane in the gas stream to carbon dioxide and water. The gas stream may further comprise a sulfur compound such as sulfur dioxide ($SO_2$).

The gas stream may be an exhaust gas from a natural gas-fueled engine. The natural gas-fueled engine is typically fueled by natural gas, including compressed natural gas and liquefied natural gas. Typical natural gas-fueled engines include spark ignited and diesel ignited (i.e., compression-ignition) engines. The natural gas-fueled engine may also be fueled by a mixture of natural gas, that is either compressed natural gas or liquefied natural gas, and one or more other hydrocarbon fuels, including gasoline, kerosene, diesel or gasoil.

Exemplary natural gas-fueled engines include heavy duty transport engines, such as those used in the trucking, mining, marine, and rail industries. Additional exemplary natural gas-fueled engines include stationary service engines, such as natural gas compressors, gas turbines, and power plant service engines.

Natural gas-fueled engines may operate alternatively in either fuel-lean or fuel-rich burn modes.

Fuel-lean burn mode refers to engine operation in which fuel is burned with an excess of air, i.e. oxygen. For example, in fuel-lean burn mode, oxygen molecules and methane molecules may be provided to the natural gas-fueled engine in a molar ratio of oxygen to methane molecules (also referred to as $O_2:CH_4$ ratio) exceeding 2:1 up to 100:1. Fuel-rich burn mode, as used herein, means maintaining an, approximately, stoichiometric ratio of oxygen molecules to hydrocarbon molecules, i.e. an $O_2:CH_4$ ratio of 2.

Preferably, the natural gas-fueled engine is operated in a fuel lean burn mode. By operating the natural gas-fueled engine in a fuel lean mode, at least part, and preferably all, of the oxygen required to oxidize the methane in the exhaust gas is provided as part of the exhaust gas.

The inventive process for oxidizing methane may treat an exhaust gas that contains a methane concentration of more than 1 ppmv up to 10,000 ppm by volume (ppmv), preferably in the range of from 25 ppmv to 10,000 ppmv, more preferably of from 50 to 5,000 ppmv, and even more preferably, from 100 to 3,000 ppmv.

In the preferred process, the gas stream that contains methane and oxygen is contacted with the methane oxidation catalyst in a $O_2:CH_4$ ratio at least 2:1, more preferably at least 10:1, and even most preferably at least 30:1. $O_2:CH_4$ ratio should be at least 2:1.

The gas stream of the process is normally contacted with the methane oxidation catalyst of the invention at a temperature in the range of from 120 to 650° C. A characteristic of the inventive methane oxidation catalyst is its exceptionally high methane oxidation activity as evidenced by it providing for a comparatively low T(50) temperature. The contacting temperature required by this catalyst for providing high methane conversion is materially lower than the temperatures required by other prior art catalysts for achieving the same percentage of methane conversion.

It is preferred for the contacting temperature of the process to be at least 350° C. but less than 525° C. to achieve good methane conversion. Excellent methane conversion is achievable with the inventive catalyst with a contacting temperature in the range of from 400° C. to 500° C., and, even, from 425° C. to 475° C.

The oxygen used to oxidize the methane may be provided as part of the gas stream comprising methane, for instance the exhaust gas, or from an external source, such as air, oxygen enriched air, pure oxygen or mixtures of oxygen with one or more other, preferably inert, gases.

In addition to the gas stream containing methane, it may further comprise water in the range of from 1 to 20 vol % water, and, more typically, of from 8 to 15 vol %.

The gas stream may further comprise $SO_2$. Typically, the $SO_2$ concentration in the gas stream is in the range from 1 ppmv upwardly to 50 ppmv. More typically, the $SO_2$ concentration is in the range of from 1 ppmv to 30 ppmv. Sulphur is known to for its ability to deactivate noble metal catalysts. But, as described herein, the methane oxidation catalyst of the invention is resistant to this type of deactivation which makes the catalyst particularly suitable for treating or processing methane-containing gas streams that include concentrations of sulfur.

The feed rate of the gas stream contacted with the methane oxidation catalyst is such to provide a gas hourly space velocity (GHSV) in the range of from 10,000 to 120,000 $hr^{-1}$, and preferably of from 20,000 to 100,000 $hr^{-1}$.

The following examples illustrate the invention, but they are not intended to limit its scope.

Example I

This Example I presents descriptions of the preparations of various embodiments of the inventive methane oxidation catalyst and of comparison catalysts.

Example 1A (Ru—Pt/tm-$ZrO_2$ (Powder))

Five grams of tm-$ZrO_2$ powder was placed in a 50 mL glass beaker followed by the addition of 27.6 mL of 0.1 M aqueous HCl solution and 1.358 mL of Nyacol ZR100/20 zirconia sol. This mixture was further mixed and dispersed for 60 seconds by high rpm shear mixing. After the shear mixing, the beaker was covered with a watch glass (to prevent evaporation of water), and the slurry was stirred for 5 minutes using a magnetic stirrer.

A platinum and ruthenium solution, including 803 µL $RuCl_3$ solution (Umicore, 20.5 wt. % Ru) and 247 µL $H_2[PtCl_6]$ solution (Umicore, CPA solution, 25 wt. % Pt), was premixed in a beaker, kept at room temperature for at least 15 mins, but not for more than 2 hrs, and then added dropwise (under stirring) to the zirconia slurry in the beaker. The obtained slurry was then homogenized for 30 seconds by high rpm shear mixing.

The slurry mixture was dried by stirring and heating overnight at 60° C. The dried catalyst powder was transferred to a porcelain dish and placed in a conventional muffle oven and calcined in a flow of dry air using 5° C./min heating rate to 550° C. and held at this temperature for 6 hours. The final catalyst powder particles were crushed and sieved to obtain a particle size fraction of 350-500 μm suitable for catalytic testing.

The final catalyst sample comprised 4.72 wt. % Ru and 1.89 wt. % Pt, based on the whole catalyst sample mass.

Example 1B (Ru—Pt/Tm—ZrO$_2$ (Coated on a Monolith Substrate))

Sixty grams of tm-ZrO$_2$ powder was placed in a 100 mL glass beaker followed by the addition of 11.96 mL of 0.1 M aqueous HCl solution and 16.17 mL of Nyacol ZR100/20 zirconia sol. This mixture was further mixed and dispersed for 60 seconds by high rpm shear mixing. After the shear mixing, the beaker was covered with a watch glass (to prevent evaporation of water) and the slurry was stirred for 5 mins using a magnetic stirrer.

A platinum and ruthenium solution, including 9996 μL of RuCl$_3$ solution (Umicore, 20.5 wt. % Ru) and 2972 μL of H$_2$[PtCl$_6$] solution (Umicore, CPA solution, 25 wt. % Pt) was premixed in a beaker, kept at room temperature for at least 15 mins, but not for more than 2 hrs, and then added dropwise (under stirring) to the zirconia slurry in the beaker. The obtained slurry was then homogenized for 30 seconds by high rpm shear mixing.

A dried and cleaned (with compressed air) 1 in. diameter by 2" in length monolith was then dipped into the slurry for 30 seconds. The slurry-coated monolith was removed from the beaker, drained, and the excess slurry washcoat was removed by shaking the monolith followed by gentle blowing with air. The dried, washcoated monolith was then calcined under dry air flow of 2 L/min at 550° C. (5° C./min heating rate) for 6 hrs to obtain the finished catalyst. The washcoat loading of the monolith was determined to be 3.5 g/in$^3$.

Examples 2 A-G (Ru—Pt/tm-ZrO$_2$)

Samples 2A-G were prepared using the same procedure described in Example 1A but adjusting the amounts of the platinum and ruthenium components added to the zirconia slurry to give the metal concentrations in the final catalyst powders that are listed in the following Table 1.

TABLE 1

| Example No. | Final Ru content, wt. % | Final Pt content, wt. % |
|---|---|---|
| Example 2A | 0.47 | 1.88 |
| Example 2B | 0.94 | 1.88 |
| Example 2C | 1.88 | 1.88 |
| Example 2D | 2.83 | 1.88 |
| Example 2E | 3.77 | 1.89 |
| Example 2F | 5.66 | 1.89 |
| Example 2G | 6.61 | 1.89 |

Comparative Example 3 (Ru/ZrO$_2$)

Five grams of ZrO$_2$ powder was placed in a 50 mL glass beaker followed by the addition of 27.9 mL of 0.1 M aqueous HCl solution and 1.358 mL of Nyacol ZR100/20 zirconia sol. This mixture was further mixed and dispersed for 60 seconds by high rpm shear mixing. After the shear mixing, the beaker was covered with a watch glass (to prevent evaporation of water) and the slurry was stirred for 5 mins with a magnetic stirrer.

A premixed ruthenium solution, including 786 μL of RuCl$_3$ solution (Umicore, 20.5 wt. % Ru), was added dropwise (under stirring) to the zirconia slurry in the beaker. The obtained slurry was then homogenized for 30 seconds by high rpm shear mixing. The slurry mixture was dried by stirring and heating at 60° C. overnight.

Following the drying, the dried catalyst powder was transferred to a porcelain dish, placed in a conventional muffle oven and calcined in a flow of dry air using 5° C./min heating rate to 550° C. and held at this temperature for 6 hours. The final catalyst powder particles were crushed and sieved to obtain a particle size fraction of 350-500 μm.

The final catalyst sample comprised 4.7 wt % Ru with ZrO$_2$ as the reminder.

Comparative Example 4 (Pt/ZrO$_2$)

Five grams of ZrO$_2$ powder is placed in a 50 mL glass beaker followed by the addition of 28.4 mL quantity of 0.1 M aqueous HCl solution and 1.358 mL quantity of Nyacol ZR100/20 zirconia sol. This mixture was further mixed and dispersed for 60 seconds at 11,000 rpm with a shear mixer. Following the shear mixing, the beaker was covered with a watch glass (to prevent evaporation of water) and the slurry was stirred for 5 mins using a magnetic stirrer.

A 234 μL quantity of H$_2$[PtCl$_6$] solution (Umicore, CPA solution, 25 wt. % Pt) was then added dropwise (under stirring) to the zirconia slurry in the beaker. The obtained slurry was further homogenized for 30 seconds at 11000 rpm with the shear mixer.

The drying of the wet platinum-impregnated zirconia was accomplished by removing the watch glass and by heating it at 60° C. (under stirring) overnight.

The dried catalyst powder was then transferred to a porcelain dish, placed in a conventional muffle oven and calcined in a flow of dry air using 5° C./min heating rate to 550° C. and held at this temperature for 6 hours. After cooling the oven to room temperature, the final catalyst powder particles where pressed, crushed and sieved to obtain a catalyst particles of the size fraction from 350-500 μm.

The final chemical composition of the catalyst was 1.88% wt Pt with ZrO$_2$ as the remainder.

Comparative Example 5 (Ru—Pt/Tm—ZrO$_2$ Metal Precursors are Metal Nitrate Salts)

Five grams of tm-ZrO$_2$ powder was placed in a 50 mL glass beaker followed by the addition of 26.8 mL of deionized water and 1.358 mL of Nyacol ZR100/20 zirconia sol. This mixture was further mixed and dispersed for 60 seconds at 11000 rpm with a shear mixer. After the shear mixing, the beaker was covered with a watch glass (to prevent evaporation of water) and the slurry was stirred for 5 mins with a magnetic stirrer.

A platinum and ruthenium solution, including 1538 μL of RuNO(NO$_3$)$_3$ solution (Umicore, 1.716 mol/L) and 353 μL of Pt(NO$_3$)$_2$ solution (Umicore, 1.551 mol/L) was premixed in a beaker, kept at room temperature for at least 15 mins, but not for more than 2 hrs and then added dropwise (under stirring) to the zirconia slurry in the beaker. The obtained slurry was then homogenized for 30 seconds at 11,000 rpm with the shear mixer.

The drying of the wet catalyst was accomplished by removing the watch glass from the beaker and heating its content at 60° C. (under stirring) overnight.

The finishing of the catalyst was accomplished by transferring the dried powder to a porcelain dish and calcining it in a flow of dry air using 5° C./min heating rate to 550° C. and holding it at this temperature for 6 hours. After cooling to room temperature, the final catalyst powder particles were pressed, crushed and sieved to obtain catalyst particles of the size fraction of 350-500 μm.

The chemical composition of the finished catalyst was 4.7% wt. Ru, 1.88% wt. Pt and a remaining balance of tm-$ZrO_2$.

Comparative Example 6 (Ru—Pt/$Al_2O_3$)

Five grams of $Al_2O_3$ powder (Sasol Puralox TH 100/150) was placed in a 50 mL glass beaker followed by addition of 27.6 mL of 0.1 M aqueous HCl solution and 1.358 mL of Nyacol ZR100/20 zirconia sol. This mixture was further mixed and dispersed for 60 seconds at 11,000 rpm with a shear mixer. Following the shear mixing, the beaker was covered with a watch glass (to prevent evaporation of water) and the slurry was stirred for 5 minutes with a magnetic stirrer.

A platinum and ruthenium solution, including 748 μL of $RuCl_3$ solution (Umicore, 20.5 wt. % Ru) and 245 μL of $H_2[PtCl_6]$ solution (Umicore, CPA solution, 25 wt. % Pt), was premixed in a beaker, kept at room temperature for at least 15 mins, but not for more than 2 hrs and then added dropwise (under stirring) to the alumina slurry. The obtained slurry was further homogenized for 30 seconds at 11000 rpm with the shear mixer.

The drying of the wet catalyst was accomplished by removing the watch glass and heating the content of the beaker at 60° C. (under stirring) overnight.

The dried catalyst powder was then transferred to a porcelain dish, placed in a conventional muffle oven and calcined in a flow of dry air using 5° C./min heating rate to 550° C. and held at this temperature for 6 hours. After cooling to room temperature, the final catalyst powder particles were pressed, crushed and sieved to obtain catalyst particles of the size fraction of 350-500 μm.

The chemical composition of the finished catalyst was 4.7% wt. Ru, 1.88% wt. Pt and a remaining balance of $Al_2O_3$.

Comparative Example 7 (Ru—Pt/$SiO_2$)

Five grams of $SiO_2$ powder (Evonik Aeroperl 300/30) is placed in a 50 mL glass beaker. 27.6 mL of 0.1 M aqueous HCl solution and 1.358 mL of Nyacol ZR100/20 zirconia sol were added to the $SiO_2$ powder in the beaker. The obtained mixture was then subjected to mixing for 60 seconds at 11000 rpm with a shear mixer. Following the shear mixing, the beaker was covered with a watch glass (to prevent evaporation of water) and the slurry was stirred for 5 minutes with a magnetic stirrer.

A premixed ruthenium and platinum solution, including 755 μL of $RuCl_3$ solution (Umicore, 20.5 wt. % Ru) and 247 μL of $H_2[PtCl_6]$ solution (Umicore, CPA solution, 25 wt. % Pt) was added dropwise (under stirring) to the silica slurry in the beaker. The obtained slurry was further homogenized for 30 seconds by high rpm shear mixing.

The wet catalyst mixture was dried by removing of the watch glass and heating the contents of the beaker at 60° C. (under stirring) overnight.

The dried catalyst powder was transferred to a porcelain dish, placed in a conventional muffle oven and calcined in a flow of dry air using 5° C./min heating rate to 550° C. and held at this temperature for 6 hours. After cooling to room temperature, the final catalyst powder particles were pressed, crushed and sieved to obtain catalyst with a particle size fraction of 350-500 μm.

The chemical composition of the final catalyst was 4.7% wt. Ru, 1.88% wt. Pt and the remaining balance $SiO_2$.

Comparative Example 8 (Ru—Pt/$SiO_2$—$Al_2O_3$)

Five grams of $SiO_2$—$Al_2O_3$ powder (Sasol Siralox 10/360) was placed in a 50 mL glass beaker. 27.6 mL of 0.1 M aqueous HCl solution and 1.358 mL of Nyacol ZR100/20 zirconia sol were added to the $SiO_2$—$Al_2O_3$ powder in the beaker. The obtained mixture was subjected to mixing for 60 seconds at 11000 rpm with a shear mixer. Following the shear mixing, the beaker was covered with a watch glass (to prevent evaporation of water) and the slurry was stirred for 5 minutes with a magnetic stirrer.

A premixed ruthenium and platinum solution, including 767 μL of $RuCl_3$ solution (Umicore, 20.5 wt. % Ru) and 251 μL of $H_2[PtCl_6]$ solution (Umicore, CPA solution, 25 wt. % Pt) was added dropwise (under stirring) to the silica-alumina-composite slurry in the beaker. The obtained slurry was further homogenized for 30 seconds by high rpm the shear mixing.

The wet catalyst mixture was dried by heating the content of the beaker at 60° C. (under stirring) overnight.

The dried powder was transferred to a porcelain dish, placed in a conventional muffle oven and calcined in a flow of dry air using 5° C./min heating rate to 550° C. and held at this temperature for 6 hours. After cooling to room temperature and the final catalyst powder particles are pressed, crushed and sieved to receive a suitable for catalytic test catalyst particle size fraction of 350-500 μm.

The chemical composition of the finished catalyst was 4.7% wt. Ru, 1.88% wt. Pt and the remaining balance $SiO_2$—$Al_2O_3$.

Comparative Example 9 (Ru—Pt/$CeO_2$)

Five grams of $CeO_2$ powder (Alfa Aesar) was placed in a 50 mL glass beaker. 27.6 mL quantity of 0.1 M aqueous HCl solution and 1.358 mL of Nyacol ZR100/20 zirconia sol were then added to the $CeO_2$ powder in the beaker. The obtained mixture was subjected to vigorous mixing for 60 seconds at 11000 rpm with a shear mixer. Following the shear mixing, the beaker was covered with a watch glass and the slurry was stirred for 5 minutes with a magnetic stirrer.

A premixed ruthenium and platinum solution, including 810 μL of $RuCl_3$ solution (Umicore, 20.5 wt. % Ru) and 266 μL of $H_2[PtCl_6]$ solution (Umicore, CPA solution, 25 wt. % Pt) was added dropwise (under stirring) to the ceria slurry in the beaker. The obtained slurry was further homogenized by high rpm shear mixing.

The wet catalyst mixture was dried heating the catalyst in the beaker at 60° C. (under stirring) overnight.

The dried powder was transferred to a porcelain dish, placed in a conventional muffle oven and calcined in a flow of dry air using 5° C./min heating rate to 550° C. and held at this temperature for 6 hours. After cooling to room temperature the final catalyst powder particles were pressed, crushed and sieved to obtain a suitable for catalytic test catalyst particle size fraction of 350-500 μm.

The chemical composition of the finished catalyst was 4.7% wt. Ru, 1.88% wt. Pt and the remaining balance $CeO_2$.

Comparative Example 10 (Pd—Pt—Rh/ZrO$_2$ (powder))

60 grams of ZrO$_2$ powder was placed in a 100 mL beaker. 16.7 mL of deionized water and 16.17 mL of Nyacol ZR100/20 zirconia sol were added to the ZrO$_2$ powder in the beaker to prepare a slurry. The obtained slurry was subjected to vigorous mixing for 30 seconds at 11000 rpm with a shear mixer. Following the shear mixing, the beaker was covered with a watch glass (to prevent water evaporation) and the slurry was stirred for 5 minutes with a magnetic stirrer.

The palladium, platinum and rhenium (Pd—Pt—Rh) solution preparation step: 6463 μL of Pd(NO$_3$)$_2$ solution (Umicore, HNO$_3$-containing, ACG type, 23.88 wt. % Pd), 1032 μL of Pt(NO$_3$)$_2$ solution (Umicore, HNO$_3$-containing, H type, 17.89 wt. % Pt) and 670 μL of Rh(NO$_3$)$_3$ solution (Umicore, HNO$_3$-containing, 8.99 wt. % Rh) were added to a beaker that contains 5063 mg citric acid (anhydrous, Merck-Schuchardt) and 6.835 mL of deionized water and mixed to provide the solution. The solution was stirred and kept at room temperature for at least 15 mins, but not for more than 2 hrs. The PGM solution was added dropwise (under stirring) to the zirconia slurry in the beaker. The slurry was vigorously homogenized for 30 seconds at 11000 rpm with the shear mixer (IKA, T25 Basic dispersing instrument, equipped with S 25 N-18 G).

The prepared mixture was dried by heating the content of the beaker at 80° C. (under stirring) overnight.

The dried powder was transferred to a porcelain dish, placed in a conventional muffle oven and calcined in a flow of dry air using 5° C./min heating rate to 600° C. and holding it at this temperature for 12 hours. After cooling to room temperature the final catalyst powder particles were crushed and sieved to obtain a suitable for a catalytic testing catalyst particle size fraction of 350-500 μm.

The chemical composition of the finished catalyst was 3.76% wt. Pd, 0.47% wt. Pt, 0.118% wt. Rh and the remaining balance ZrO$_2$.

Comparative Example 11 (Pd—Pt—Rh/ZrO$_2$ Coated on a Monolithic Core)

60 g of ZrO$_2$ powder was placed in a 100 mL beaker. 16.7 mL of deionized water and 16.17 mL of Nyacol ZR100/20 zirconia sol were added to the ZrO$_2$ powder in the beaker to prepare a slurry. The obtained slurry was subjected to vigorous mixing for 30 seconds at 11000 rpm with a shear mixer. Following the shear mixing, the beaker was covered with a watch glass (to prevent water evaporation) and the slurry was stirred for 5 minutes with a magnetic stirrer.

The palladium, platinum and rhenium (Pd—Pt—Rh) solution preparation step: 6463 μL of Pd(NO$_3$)$_2$ solution (Umicore, HNO$_3$-containing, ACG type, 23.88 wt. % Pd), 1032 μL of Pt(NO$_3$)$_2$ solution (Umicore, HNO$_3$-containing, H type, 17.89 wt. % Pt) and a 670 μL quantity of Rh(NO$_3$)$_3$ solution (Umicore, HNO$_3$-containing, 8.99 wt. % Rh) were added to a beaker that contained 5063 mg citric acid (anhydrous, Merck-Schuchardt) and 6.835 mL of deionized water and mixed to provide the solution. The PD-Pt—Rh solution was then added dropwise (under stirring) to the zirconia slurry in the beaker. The slurry was vigorously homogenized for 30 seconds at 11000 rpm with the shear mixing.

A dried and cleaned (with compressed air) 1 inch in diameter by 2-inch length monolith was then slowly dipped into the slurry for 30 sec. Afterwards, the monolith was removed from the beaker and excess catalyst wash coat slurry drained. Additional excess wash coat was removed via shaking of the monolith, followed by gentle air blowing with an air knife. The wash coated monolith was subjected to drying at maximum of 80° C. using a heat gun. The dried monolith was placed in a muffle furnace and calcined under dry air flow at 600° C. (5° C./min heating rate) for 3 hrs.

The chemical composition of the finished catalyst was 3.76% wt. Pd, 0.47% wt. Pt, 0.118% wt. Rh and the remaining balance ZrO$_2$.

Comparative Example 12 (Pd—Pt/Al$_2$O$_3$)

A commercially available alumina extrudate from Saint-Gobain was crushed and sieved to obtain a fraction with particle sizes in the range of 315-500 μm. The resulting powder was calcined in air at 650° C. for 12 h.

Three grams of the calcined alumina powder was impregnated with a solution containing 0.97 mL aqueous HNO$_3$-containing Pd(NO$_3$)$_2$ (conc. 1 mol/L), 0.22 mL aqueous HNO$_3$-containing Pt(NO$_3$)$_2$ (conc. 0.5 mol/L), and 0.62 mL water.

The obtained wet catalyst sample was aged for 3 hours in a closed container at room temperature and dried for 16 hours at 80° C. in a drying oven.

Subsequently, the catalyst was calcined in a flow of air using 5° C./min heating rate to 600° C. and by holding it at this temperature for 12 hours.

The chemical composition of the finished catalyst was found to be 4% wt. Pd, 0.5% wt. Pt with the remaining balance ZrO$_2$.

Example II (Catalyst Performance Test 1)

This Example II describes the experimental procedure used to test the performance of the catalyst samples described in Example I.

For this test, the methane oxidation activity measurements were carried out in a fully automated parallelized catalyst testing rig with 48 fixed bed stainless steel reactors (1 mL total volume each). The catalysts were loaded in the reactors and tested by simulating exhaust gas composition and operating condition typically encountered in natural gas fueled engines operated with an oxygen surplus (under fuel-lean regime).

The conditions used for the testing are shown in Table 2.

TABLE 2

| Catalyst Testing Conditions | |
|---|---|
| Temperature range | 375-550° C. |
| Pressure | ambient |
| Exhaust gas composition | 2000 ppmv CH4, 1000 ppmv CO, 150 ppmv NO, 7.5 vol % CO$_2$, 6 vol % O$_2$, 15 vol % H2O, balance N$_2$ |
| GHSV | 50000 hr$^{-1}$ |
| Mass of catalyst | 0.2 g |
| Catalyst particle size fraction | 315-500 μm |

Crushed and sieved fractions of the catalysts with particle sizes from 315-500 μm were used for the catalytic performance testing. For each reactor loading, the desired catalyst mass was diluted with an inert material (corundum) of the same particle size fraction to a total reactor volume of 1 mL. This was done to mimic a methane oxidation catalyst provided on a monolith substrate containing 213 g of a methane oxidation catalyst washcoat per liter of total catalyst volume (including the monolith substrate).

$T_{50}$ (CH$_4$) values (temperature requirement for 50 vol. % CH$_4$ conversion) for "de-greened" catalysts taken after >100 h time-on-stream were used as criteria for the evaluation of methane oxidation activity. For all the tested catalysts, the CO conversion obtained during these tests at the temperature range listed in Table 2 was 100%.

Example III (Catalyst Performance Test 2)

This Example III describes the experimental procedure used to age fresh catalyst to provide the sulfur-aged catalysts described in Example I and which performance was tested by using the procedure of Example II.

Catalyst samples (in the form of a powder) were pre-treated with a sulfur-containing simulated exhaust gas mixture to show the impact of sulfur on their catalytic performance in methane oxidation. The accelerated sulfur ageing experiments were carried out with a higher sulfur concentration than is typically seen in exhaust gas. This was to simulate, over short period of time, a long period of exposure with an exhaust gas having a significantly lower sulfur level. Table 3 shows the conditions used for the sulfur-ageing of the catalyst.

After the ageing experiment, the reactors were placed in a dedicated catalyst testing unit to perform the testing described in Example II in a sulfur-free exhaust gas environment.

An evaluation of the catalyst sulfur resistance is made based on the difference in $T_{50}$ (CH$_4$) of fresh catalyst and $T_{50}$ (CH$_4$) of sulfur-aged catalyst.

TABLE 3

| Accelerated sulfur ageing conditions | |
| --- | --- |
| Temperature | 470° C. |
| Pressure | ambient |
| Ageing Gas Composition | 500 ppmv CH$_4$; 10 vol % H$_2$O; 5 ppmv SO$_2$; balance air |
| GHSV | 10000 hr$^{-1}$ |
| Duration | |
| Mass of Catalyst | 0.213 g |
| Catalyst Particle Size Fraction | 315-500 μm |

Example IV (Monolith-Catalyst Performance Test 3)

This Example IV describes the experimental procedure used to test the performance of the monoliths described in Example I.

For this particular test, a one-inch diameter by two inch length monolith methane oxidation catalyst cores were loaded and tested in a two-core reactor testing rig. A proper sealing between monolithic methane oxidation catalyst and reactor wall was used to avoid exhaust gas flow by-pass and to force the gas to flow through the inner channels of the monolith. The catalysts were then tested by using exhaust gas compositions and operating conditions similar to these typically encountered in natural gas fueled engines operated with an oxygen surplus (under fuel-lean regime).

Table 4 shows the conditions used for the testing.

TABLE 4

| Catalyst Testing Conditions II and monolithic methane oxidation catalyst properties | |
| --- | --- |
| Temperature | 425° C. |
| Pressure | ambient |
| Exhaust gas composition (sulfur free) | 2000 ppmv CH$_4$, 500 ppmv CO, 280 ppmv NO, 7 vol % CO$_2$, 8.4 vol % O$_2$, 12.5 vol % H$_2$O, balance N$_2$ |
| Exhaust gas composition (sulfur containing) | 2000 ppmv CH$_4$, 500 ppmv CO, 280 ppmv NO, 7 vol % CO$_2$, 8.4 vol % O$_2$, 12.5 vol % H$_2$O, 0.15 or 1.5 ppmv SO$_2$, balance N2 100000 hr$^{-1}$ |
| GHSV | 100000 hr$^{-1}$ |
| Catalyst monolith size | 1" diameter and 2" length |
| Monolith cell density | 400 cpsi |
| Monolith material | Ceramic (cordierite) |
| Washcoat loading | 3.5 g/in$^3$ |

The monolithic methane oxidation catalyst was placed in the reactor, heated at the rate of 10° C./min to 425° C. under constant exhaust gas mimicking mixture flow and kept at this temperature for the length of the catalytic test. Table 4 presents the exhaust gas composition (sulfur free). After 2 hours of time-on-stream, the exhaust gas composition was changed from "sulfur free" to "sulfur containing" and the test was carried out under these operating conditions until the end of the experiment.

Table 4 presents the sulfur-free and sulfur-containing exhaust gas compositions.

Table 5 shows the T(50) values for the inventive platinum-ruthenium methane oxidation catalyst and the comparison catalysts that contain only a single noble metal catalytic component on the same type of support. Conditions for the testing are as described in the above catalytic performance evaluation Test I example.

Figure 1:
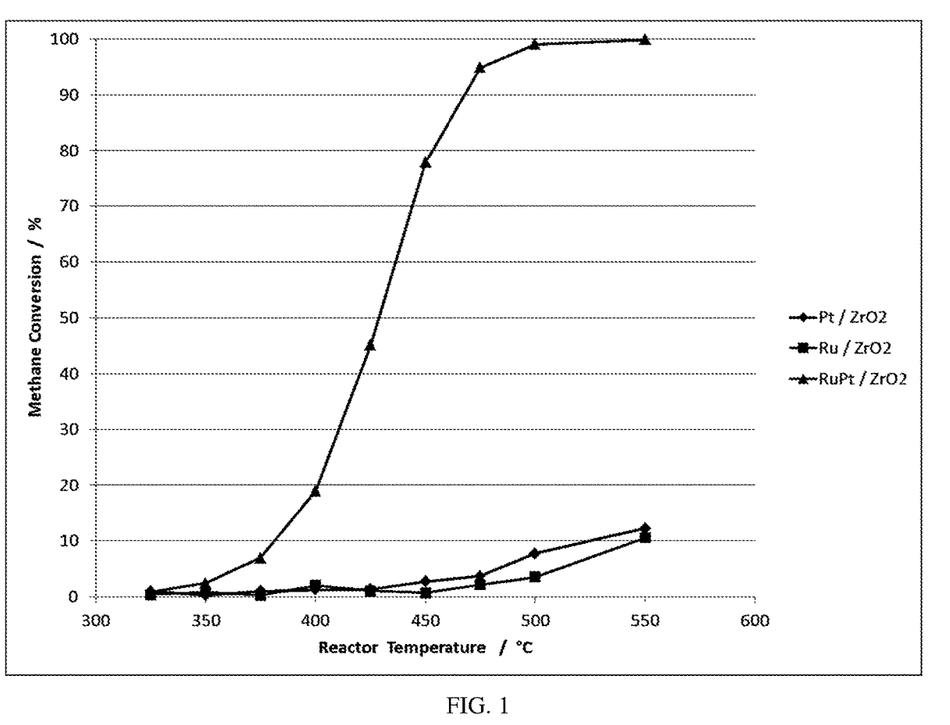
FIG. 1 presents plots comparing the methane conversion performance as a function of reaction temperature of an inventive platinum-ruthenium catalyst and comparison catalysts having either platinum alone or ruthenium alone and showing that the platinum-ruthenium catalyst performs better than a catalyst containing only one metal.

Plots of the methane conversion performance as a function of reaction temperature for the catalysts of Table 5 are presented if FIG. 1. From these plots the $T(50)_{CH4}$ values (temperature requirements for 50% CH$_4$ conversion) were determined.

TABLE 5

| Example No. | Sample Description | T(50)/° C. |
| --- | --- | --- |
| Example 1A | Ru Pt/ZrO$_2$ | 428 |
| Comparative Example 3 | Ru/ZrO$_2$ | Not Achieved |
| Comparative Example 4 | Pt/ZrO$_2$ | Not Achieved |

The performance data shown in FIG. 1 and Table 5 show that the zirconia-supported two-metal ruthenium-platinum catalyst provides an unexpected significantly better methane oxidation or conversion performance advantage than the comparative zirconia-supported single-noble metal catalysts. For example, the RuPt/ZrO$_2$ catalyst exhibited a T(50) CH$_4$ value of 428° C., but the ruthenium-only and the platinum-only ZrO$_2$ catalysts exhibited a materially lower (max ~11%) methane oxidation activity at the same temperature. The single-noble metal catalysts contained the same levels of Ru or Pt, and they were prepared using the same Ru and Pt chlorine-based precursors and ZrO$_2$ support.

Table 6 shows the T(50) and T(40) values for the platinum-ruthenium methane oxidation catalysts made using chlorine-based noble metal precursors and nitrate-based noble metal precursors. The same zirconia support was used for these catalyst compositions. Plots of the methane conversion performance as a function of reaction temperature for these catalysts are presented in FIG. 2. From these plots $T(50)_{CH4}$ and $T(40)_{CH4}$ values were determined.

TABLE 6

| Example No. | Sample Description | T(50)/° C. | T(40)/° C. |
| --- | --- | --- | --- |
| Example 1A | Ru Pt/ZrO$_2$ (Cl-based precursor) | 428 | 425 |
| Comparative Example 5 | RuPt/ZrO$_2$ (NO$_3$-based precursor | Not Achieved | 551 |

Figure 2:
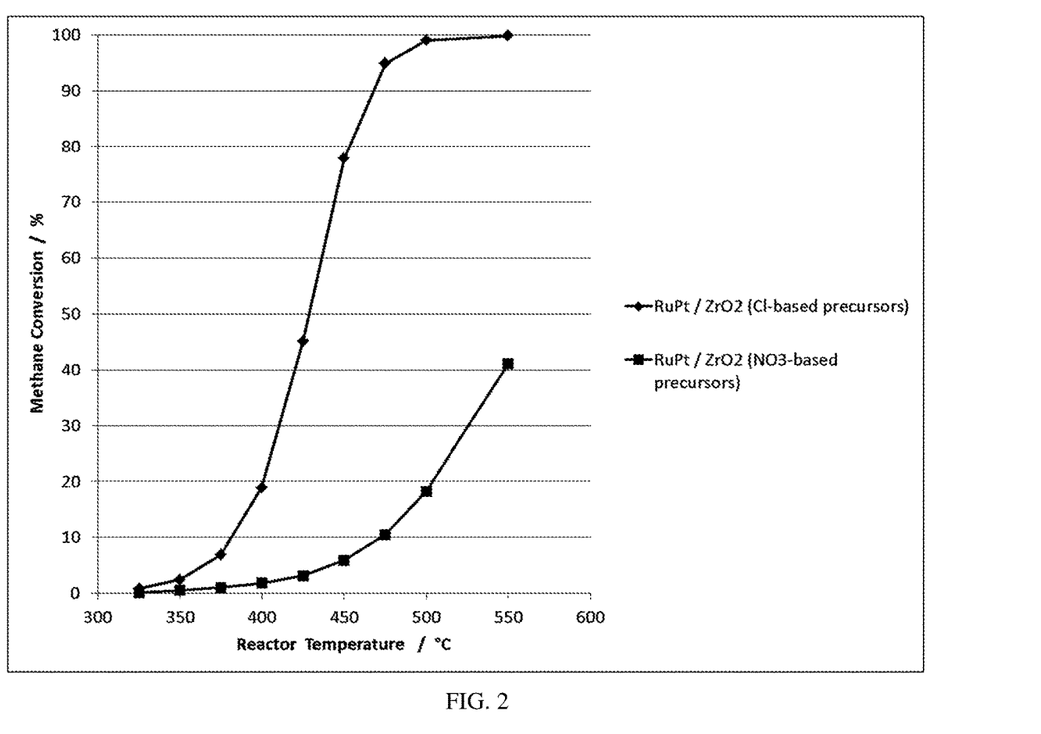
FIG. 2 presents plots comparing the methane conversion performance as a function of reaction temperature of platinum-ruthenium catalysts made using chlorine-based metal precursors and nitrate-based metal precursors showing that the catalysts prepared using the chlorine-based precursors exhibit superior catalytic performance.

The performance data shown in FIG. 2 and Table 6 show that the catalyst composition prepared using chlorine-based metal precursors performed significantly better than the catalyst composition made using nitrate-based precursors. The catalyst made with the chlorine-based precursor exhibited a T(50) value of 428° C., but the catalyst made with the nitrate-based precursor exhibited a materially lower methane conversion of only about 3% at the same temperature. The significant difference of 126° C. between the T(40) temperatures for the two catalysts is unexpected.

TABLE 7

| Example No. | Sample Description | T(50)/° C. |
| --- | --- | --- |
| Example 1A | Ru Pt/ZrO$_2$ | 428 |
| Comparative Example 6 | Ru Pt/Al$_2$O$_3$ | 478 |
| Comparative Example 7 | Ru Pt/SiO$_2$ | 470 |
| Comparative Example 8 | Ru Pt/Al$_2$O$_3$—SiO$_2$ | 471 |
| Comparative Example 9 | Ru Pt/CeO$_2$ | 511 |

Figure 3:
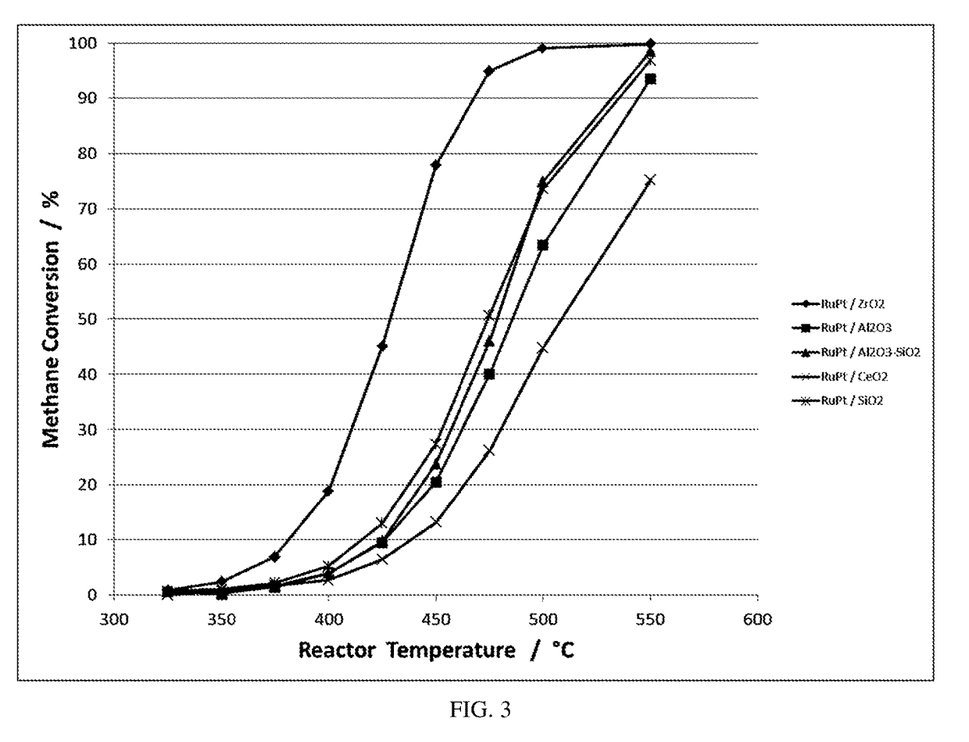
FIG. 3 presents plots comparing the methane conversion performance as a function of reaction temperature of platinum-ruthenium on different types of inorganic oxide support materials showing the effect of support type on catalytic performance.

FIG. 3 shows the methane conversion vs. reactor temperature test ("light off curves") data for powder forms of RuPt catalysts prepared on different inorganic oxide support materials (ZrO$_2$, Al$_2$O$_3$, SiO$_2$, Al$_2$O$_3$—SiO$_2$ and CeO$_2$). All catalysts were loaded with the same levels of Ru and Pt. Table 7 shows the corresponding $T(50)_{CH4}$ values obtained from these tests.

The results shown in FIG. 3 and Table 7 shows that the ZrO$_2$ supported RuPt catalyst exhibits significantly superior methane conversion ability than the comparison RuPt catalysts based on other inorganic oxide supports.

Figure 4:
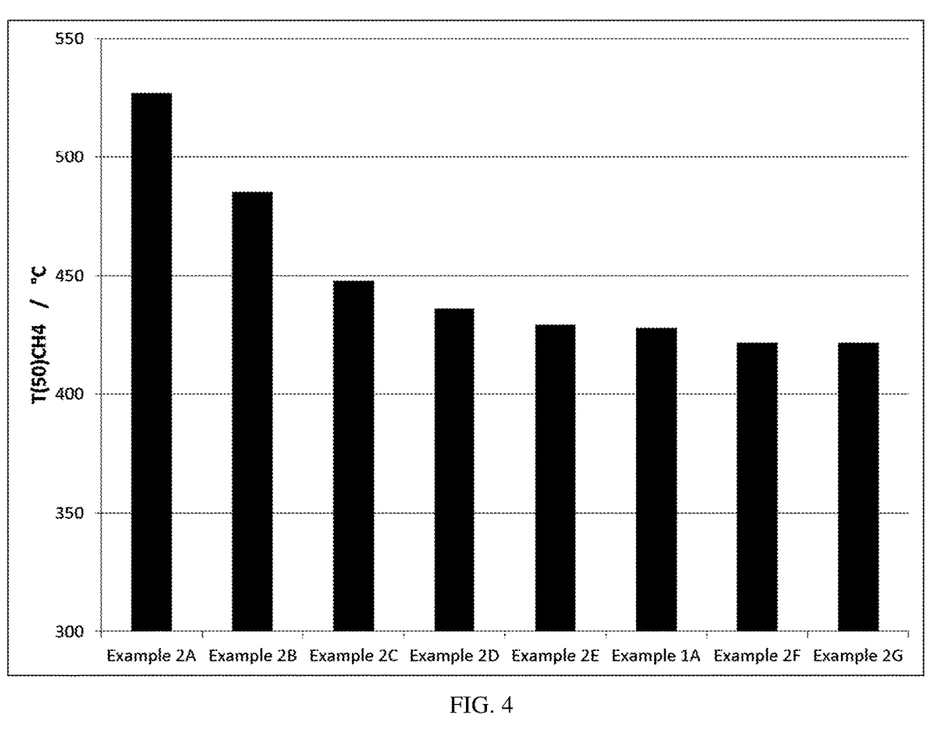
FIG. 4 presents plots comparing the methane conversion T(50) values provided by the platinum-ruthenium on zirconia catalysts having a fixed platinum concentration and various ruthenium concentrations showing the effect and criticality of ruthenium concentration on catalytic performance.

FIG. 4 and Table 8 show the T(50) values obtained from catalytic tests carried out for the inventive RuPt/ZrO$_2$ catalysts as a function of the Ru and Pt loading and weight ratio.

TABLE 8

| Example No. | T(50)/° C. | Final Ru content, wt. % | Final Pt content, wt. % | Weight Ratio of Pt/Ru |
| --- | --- | --- | --- | --- |
| Example 2A | 527 | 0.47 | 1.88 | 4 |
| Example 2B | 485 | 0.94 | 1.88 | 2 |
| Example 2C | 448 | 1.88 | 1.88 | 1 |
| Example 2D | 436 | 2.83 | 1.88 | 0.66 |
| Example 2E | 430 | 3.77 | 1.89 | 0.50 |
| Example 1A | 428 | 4.72 | 1.89 | 0.40 |

TABLE 8-continued

| Example No. | T(50)/° C. | Final Ru content, wt. % | Final Pt content, wt. % | Weight Ratio of Pt/Ru |
| --- | --- | --- | --- | --- |
| Example 2F | 422 | 5.66 | 1.89 | 0.33 |
| Example 2G | 422 | 6.61 | 1.89 | 0.29 |

The data of FIG. 4 and Table 8 show that T(50) decreases as the Ru concentration and the Ru/Pt molar ratio in the RuPt/ZrO$_2$ catalysts increase. The T(50) value substantially decreases from 527° C. for the catalyst containing 0.47% wt. (RuPt molar ratio of 0.47) and 6.61% wt. Ru (Ru/Pt molar ratio of 6.82).

Figure 5:
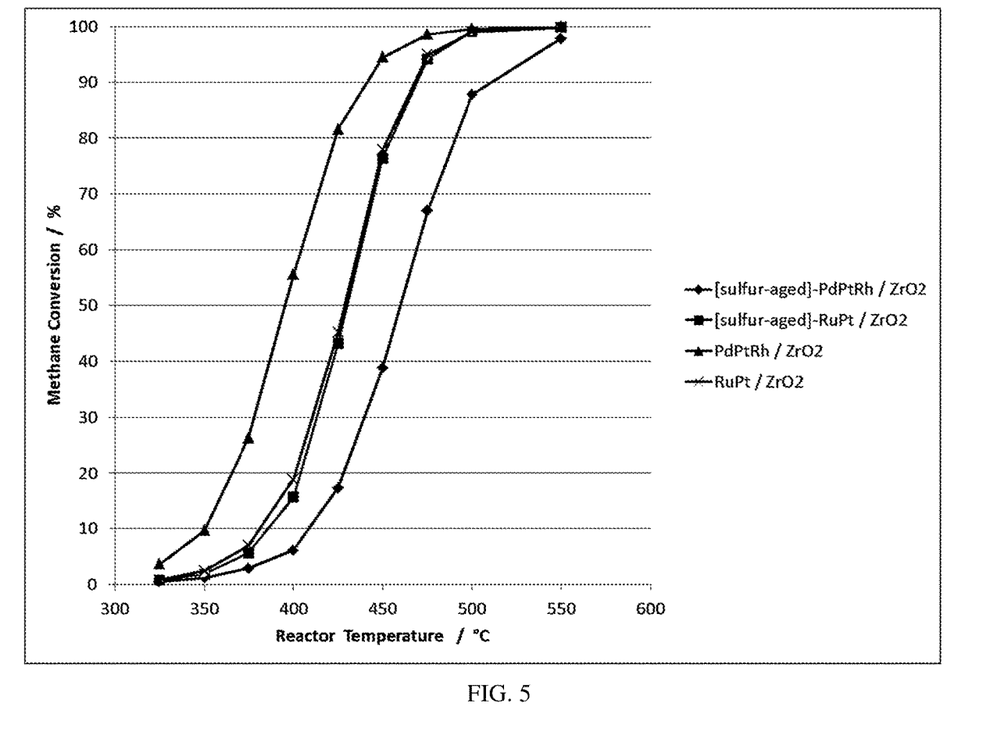
FIG. 5 presents plots of methane conversion performance as a function of reaction temperature for fresh catalyst and sulfur-aged catalyst of an embodiment of the inventive platinum-ruthenium catalyst and a comparison palladium-platinum-rhenium catalyst showing relative catalyst deactivation caused by sulfur poisoning.

FIG. 5 and Tables 9 and 10 show the $T(50)_{CH4}$ and $\Delta T(50)_{CH4}$ values obtained from catalytic tests carried out for fresh and deliberately sulfur aged RuPt/ZrO2 catalyst this invention and a reference PdPtRh/ZrO2 catalyst of the prior art. The sulfur ageing and performance testing of the catalysts were done as described above.

TABLE 9

| Example No. | Sample Description | T(50)/° C. |
| --- | --- | --- |
| Example 1A | Ru Pt/ZrO$_2$ | 428 |
| Example 1A | [sulfur-aged] Ru Pt/ZrO$_2$ | 430 |
| Comparative Example 10 | Pd—Pt—Rh/ZrO$_2$ | 395 |
| Comparative Example 10 | [sulfur aged] Pd __ Pt/ZrO$_2$ | 460 |

TABLE 10

| Example No. | Sample Description | T(50) value of fresh and sulfur-aged catalyst sample/° C. |
| --- | --- | --- |
| Example 1A | Ru Pt/ZrO$_2$ | 2 |
| Comparative Example 10 | Pd—Pt—Rh/ZrO$_2$ | 65 |

We claim:
1. A methane oxidation catalyst, comprising:
multi-crystalline zirconia, wherein said multi-crystalline zirconia includes less than 75 wt. % monoclinic zirconia and more than 10 wt. % tetragonal zirconia, based on the total weight of said multi-crystalline zirconia, and wherein multi-crystalline zirconia comprises a weight ratio of tetragonal zirconia-to-monoclinic zirconia in the range of from 1:1 to 31:1;
a platinum component;
a ruthenium component, present in said methane oxidation catalyst in an amount at least 2 wt. % up to 20 wt. %, based on the ruthenium as metal regardless of its actual form and the total weight of said methane oxidation catalyst; and
a chlorine component, wherein said chlorine component is present in said methane oxidation catalyst in an amount in the range of from 0.01 to 5 wt. %;
wherein the platinum component, the ruthenium component, and the chlorine component are supported on the multi-crystalline zirconia support.
2. The methane oxidation catalyst as recited in claim 1, wherein said platinum component is present in said methane oxidation catalyst in an amount in the range of from 0.01 to

5 wt. %, based on the platinum as metal regardless of its actual form and the total weight of said methane oxidation catalyst.

3. The methane oxidation catalyst as recited in claim 2, wherein said platinum component is present in said methane oxidation catalyst in an amount greater than 0.01 wt. % and less than 3 wt. %, based on the platinum as metal regardless of its actual form and the total weight of said methane oxidation catalyst.

4. The methane oxidation catalyst as recited in claim 1, wherein the platinum component is selected from the group consisting of platinum (II) chloride [$PtCl_2$], platinum (IV) chloride [$PtCl_4$], salts of hexachloroplatinate that include chloroplatinic acid [$H_2PtCl_6$], ammonium hexachloroplatinate [$(NH_4)_2PtCl_6$], potassium hexachloroplatinate [$K_2PtCl_6$], and sodium hexachloroplatinate [$Na_2PtCl_6$].

5. The methane oxidation catalyst as recited in claim 1, wherein the ruthenium component is selected from the group consisting of ruthenium (III) chloride [$RuCl_3$] and ruthenium oxychloride [$RuOCl_2$].

6. The methane oxidation catalyst as recited in claim 1, wherein said methane oxidation catalyst has a weight ratio of platinum-to-ruthenium of less than 1.5.

7. The methane oxidation catalyst as recited in claim 1, wherein said platinum component is formed from a chlorine-containing platinum precursor compound and said ruthenium component is formed from a chlorine-containing ruthenium precursor compound, wherein said multi-crystalline zirconia, said chlorine-containing platinum precursor compound and said chlorine-containing ruthenium precursor compound have been mixed to provide a mixture, and wherein said mixture is dried and then calcined at a calcination temperature to provide said methane oxidation catalyst.

8. The methane oxidation catalyst as recited in claim 1, wherein platinum component is formed from a chlorine-containing platinum precursor compound, wherein said multi-crystalline zirconia, said chlorine-containing platinum precursor compound, and said ruthenium component have been mixed to provide a mixture, and wherein said mixture is dried and then calcined at a calcination temperature to provide said methane oxidation catalyst.

9. The methane oxidation catalyst as recited in claim 1, wherein said ruthenium component is formed from a chlorine-containing ruthenium precursor compound, wherein said multi-crystalline zirconia, said platinum component, and said chlorine-containing ruthenium precursor compound have been mixed to provide a mixture, and wherein said mixture is dried and then calcined at a calcination temperature to provide said methane oxidation catalyst.

* * * * *